United States Patent [19]
Schweninger

[11] Patent Number: 5,823,302
[45] Date of Patent: Oct. 20, 1998

[54] TOGGLE BRAKE ASSEMBLY FOR A WHEEL OF A SHOPPING CART OR THE LIKE

[76] Inventor: Quentin David Schweninger, c/o Dellmont Leisure International, Inc. 3214 Honolulu Ave., La Crescenta, Calif. 91214

[21] Appl. No.: 652,835

[22] Filed: May 23, 1996

[51] Int. Cl.⁶ .............................. B60T 7/18; B62B 5/04
[52] U.S. Cl. ........................ 188/111; 188/19; 188/29; 280/33.994
[58] Field of Search .................... 188/19, 111, 1.11 E, 188/1.12, 17, 21, 31, 29; 280/33.994; 404/6, 9

[56] References Cited

U.S. PATENT DOCUMENTS

| | | | |
|---|---|---|---|
| 2,915,775 | 3/1959 | Skupas | 16/35 R |
| 2,964,140 | 9/1960 | Berezny | 188/111 |
| 3,029,905 | 4/1962 | Nowak | 188/111 |
| 3,117,653 | 1/1964 | Altherr | 188/29 |
| 3,295,861 | 1/1967 | Lull | 280/47.16 |
| 3,652,103 | 3/1972 | Higgs | 280/33.994 |
| 3,892,295 | 7/1975 | Hahto | 188/111 |
| 4,242,668 | 12/1980 | Herzog | 340/539 |
| 4,248,445 | 2/1981 | Vassar | 16/35 R X |
| 4,577,880 | 3/1986 | Bianco | 280/33.994 |
| 4,772,880 | 9/1988 | Goldstein et al. | 340/571 |
| 4,815,161 | 3/1989 | Timmer et al. | 16/35 R |
| 5,042,622 | 8/1991 | Smith et al. | 188/1.12 |
| 5,090,517 | 2/1992 | Doughty | 188/19 |
| 5,139,116 | 8/1992 | Screen | 188/1.12 |
| 5,194,844 | 3/1993 | Zelda | 340/426 |
| 5,315,290 | 5/1994 | Moreno et al. | . |
| 5,357,182 | 10/1994 | Wolfe et al. | . |
| 5,390,942 | 2/1995 | Schuster et al. | . |
| 5,432,412 | 7/1995 | Harris et al. | . |

*Primary Examiner*—Peter M. Poon
*Attorney, Agent, or Firm*—Oppenheimer Poms Smith

[57] ABSTRACT

For a shopping cart wheel, for example, a toggle brake assembly which can be automatically actuated by an audio frequency signal when the cart is taken out of a designated area. When actuated, a battery-powered solenoid coil of the brake assembly is energized, drawing a coil spring catch away from a locking position on a toggle. The toggle then drops with a pivotal or axial movement to a braking position against the wheel, either against the outside or inside of the wheel depending on the brake embodiment used. As the wheel rotates in either direction, the toggle wedges or hooks to brake the wheel.

16 Claims, 5 Drawing Sheets

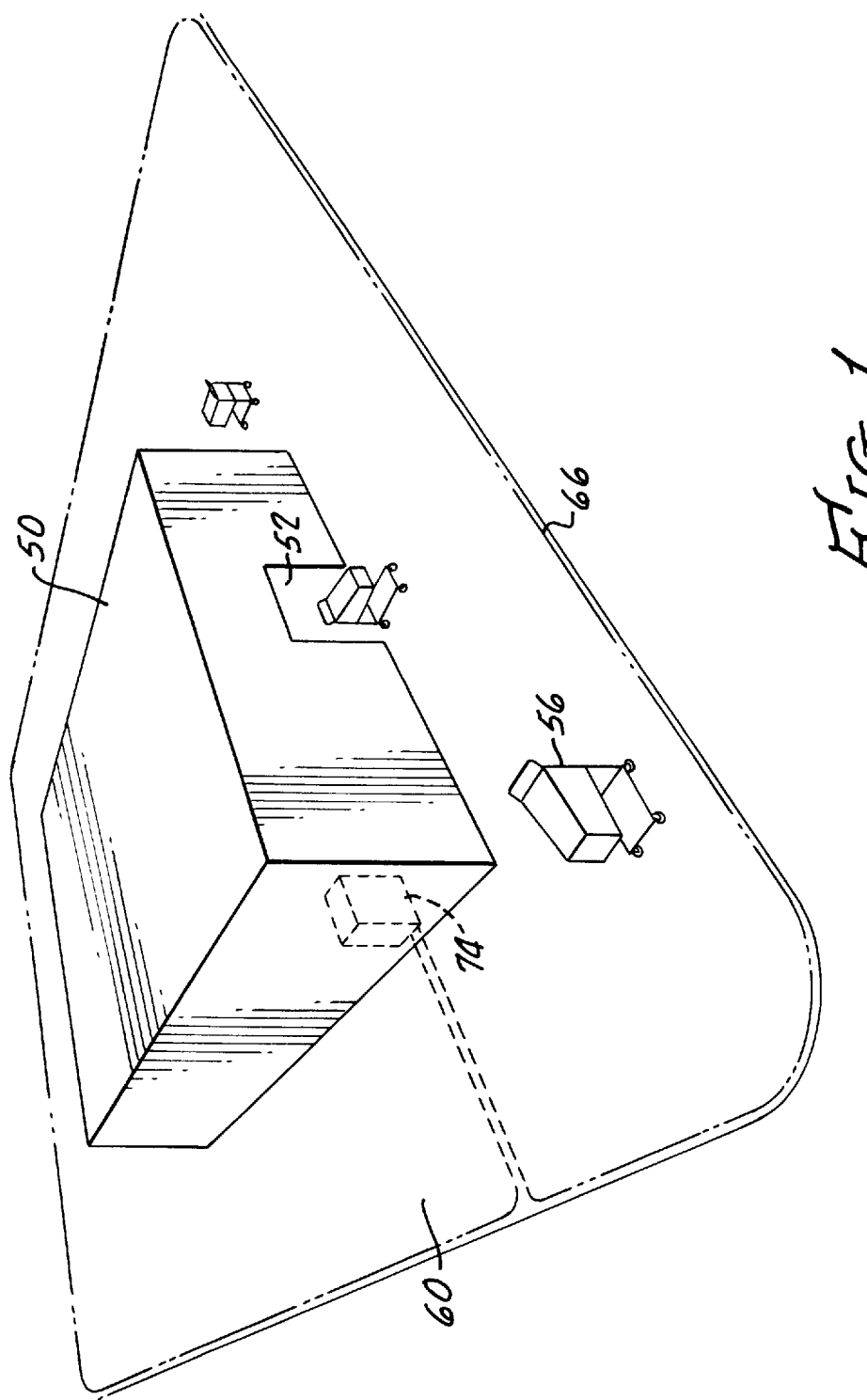

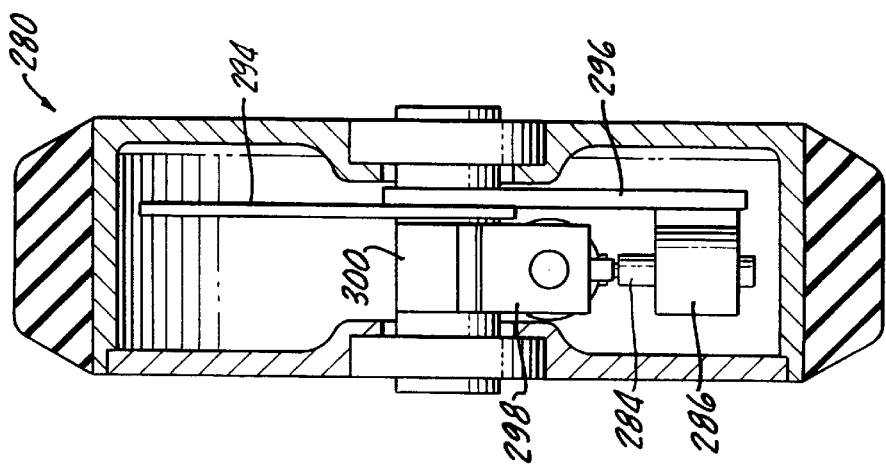
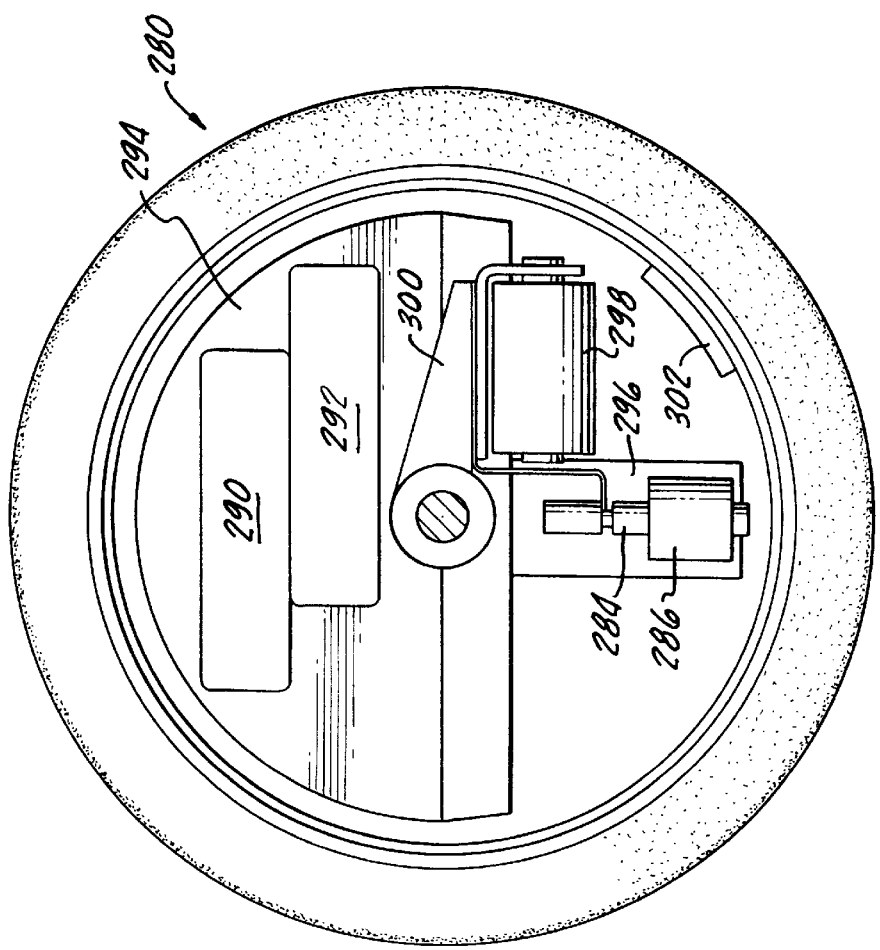

TOGGLE BRAKE ASSEMBLY FOR A WHEEL OF A SHOPPING CART OR THE LIKE

BACKGROUND OF THE INVENTION

The present invention relates to brake constructions for a shopping cart wheel or the like, and particularly those which are activated by perimeter theft control signals.

Theft or unauthorized removal of shopping carts from retail establishments has been a significant, longstanding and expensive problem for retailers, particularly grocery stores. The retailers must go to the expense of locating and retrieving the carts or replacing them. Each cart costs between $75.00 and $150.00, and those with the new monitors are even more expensive. The carts may be taken by customers who use them to wheel their purchases home or to remotely parked vehicles and then fail to return them, by vagrants who use them to hold and transport their possessions, by children who are "joyriding" with them or by thieves who take and sell them. The problem is so serious that businesses have been created expressly for locating and retrieving shopping carts which have been removed from retail establishments.

The goal, however, is to prevent the removal of the carts in the first place. One attempted solution has been to erect physical barriers blocking removal of the carts and require customers to drive up to the barriers to load their purchases from the waiting cart(s). This is time consuming and inconvenient for the customers. Additionally, attendants must often be employed to help the customers and to prevent theft of the purchases from the carts while the customers retrieve their cars.

Another attempted solution are systems which cause the carts to be immobilized by some type of signal when the carts pass a predetermined perimeter relative to the retail establishment. This requires that a brake lock or other immobilizing device or alarm to be attached to or built into the cart. Examples of such systems are shown in U.S. Pat. Nos. 2,964,140 (Berezny), 3,892,295 (Hahto), 4,242,668 (Herzog), 4,772,880 (Goldstein et al.), 5,194,844 (Zelda), 5,315,290 (Moreno et al.) and 5,357,182 (Wolfe et al.). Two other recent systems are the "KartControl" System available from Controldyne Systems, Inc. of Huntington Beach, Calif., and the "Kart Saver System" available from K-Lock & K-Alert Systems of Fairfield, Calif. However, none of these systems is widely used. They are not widely used because the immobilizing devices are often complicated in construction and operation with many moving parts, expensive to manufacture, subject to malfunction, vulnerable to rain, snow, freezing temperature and other weather conditions, vulnerable to damage by impact or spilled liquids, or provided with an inadequate power source. Some are also bulky, unattractive or stick out far enough to interfere with nesting of the carts.

Many of the above-mentioned systems use some type of brake or wheel lock as the immobilizing means. Examples of other wheel brake constructions are shown in U.S. Pat. Nos. 2,915,775 (Skupas), 3,117,653 (Altherr), 3,295,861 (Lull), 3,652,103 (Higgs), 4,248,445 (Vassar), 4,815,161 (Timmer et al.), 5,042,622 (Smith et al.), 5,090,517 (Daughty), 5,390,942 (Schuster et al.), and 5,432,412 (Harris et al.). (These and all other patents or publications mentioned anywhere in this disclosure are hereby incorporated by reference in their entireties.)

SUMMARY OF THE INVENTION

Directed to remedying the problems in the prior art, disclosed herein is an improved wheel brake for shopping carts, dollies or other push-type vehicles. It is particularly useful for shopping carts used in a perimeter control environment to deter theft of the carts. When the carts are wheeled beyond the perimeter, an audio frequency signal automatically actuates the brake. To unlock the brake, a special reset key is inserted into the brake assembly and turned.

The brake assembly includes a toggle positionable alternatively in non-braking and braking positions relative to the wheel. A spring biased catch holds the toggle in the non-braking position. The signal actuates a battery-powered solenoid coil which magnetically draws the catch away from the toggle. This releases the toggle from its non-braking position to a braking position relative to the wheel and against an interior wheel surface pursuant to an inside-the-wheel embodiment of the brake assembly) or an exterior wheel surface (pursuant to an outside-the-wheel embodiment).

In an inside-the-wheel embodiment, a stopper or cleat is mounted on the interior of the rim of the wheel. A toggle or latch is mounted inside the wheel so that it does not rotate with the wheel. When the toggle or latch is released, it pivots down so that its end engages one end of the stopper to brake the rotation of the wheel in a first rotation direction and engages the other end of the stopper to brake the rotation in the opposite direction. When the toggle or latch is later reset (as described below) in the non-braking condition, the toggle or latch is lifted so that the catch engages in a notch in the toggle. This embodiment is desirable because it is compact and retrofits easily; it is simply bolted onto the cart. Also, there is adequate space for complicated circuit board or electronic controls inside the wheel.

In the outside-the-wheel embodiment, the toggle when released drops generally perpendicularly down on an outside surface of the wheel or the tire thereof. As the wheel then rotates in a forward motion, the toggle wedges in one direction on the wheel with a braking action; and when the wheel rotates in a rearward motion, the toggle wedges in an opposite direction. When the toggle is later reset with a special key, which can be under the control of the store manager, for example, the toggle is lifted so that the catch engages it, holding it in the unlocking condition.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a perspective view showing a shopping cart theft prevention system;

FIG. 7 is a side elevational view of another alternative shopping cart wheel and internal brake assembly of the present invention; and FIG. 8 is an end elevational view of the wheel and external brake assembly of FIG. 7.

DETAILED DESCRIPTION OF PREFERRED EMBODIMENTS OF THE INVENTION

Figure 3:
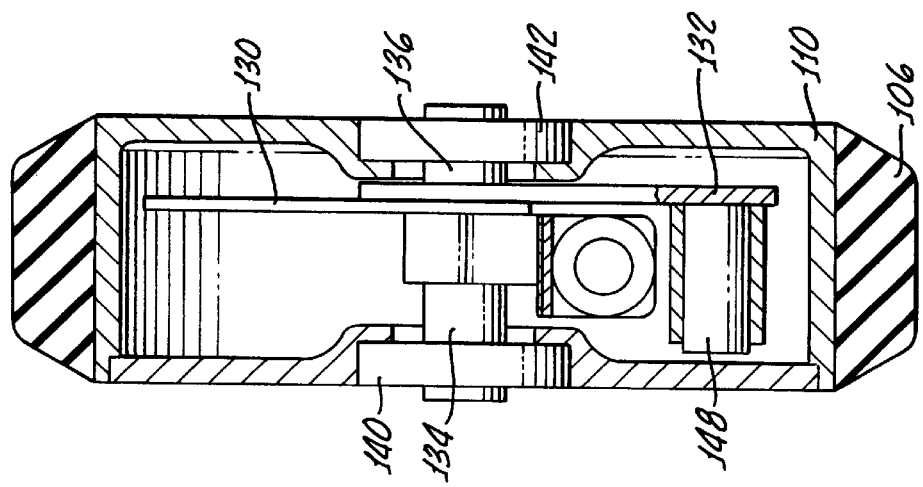
FIG. 3 is an end elevational view of the wheel and internal brake assembly of FIG. 2.

An operating environment of the present invention is illustrated in FIG. 1. Shown therein is a building 50, such as a warehouse, grocery store or other retail establishment, having a door opening 52. Customers (or employees or others) push wheeled vehicles 56 such as dollies or carts and particularly shopping carts to move goods out of the building 50, through the door 52, typically after having purchased them, out to the parking lot 60 for loading into their cars or other vehicles (not shown).

A conductor antenna 66 extends proximate a perimeter of the prescribed area or at least those portions transversable by the carts 56. A low voltage transmitter 74, positioned inside of the building 50 or in a lock box, for example, is operatively connected to the conductor antenna 66. The transmitter 74 includes a low voltage power supply driven by ordinary one hundred and twenty volt line power. The wire of the conductor antenna 66 is buried so as to be protected from impact, theft, the elements and mischief. However, it is not buried so deep so that its signal cannot be received by the cart 56 passing over or by it. More specifically, the transmitter antenna 66 can be installed in an eighth of an inch wide by one inch deep slot across each driveway or walkway access to the property or prescribed area.

Transmitter 74 sends a low frequency signal in the five kilohertz range on the conductor or peripheral wire, and the signal is strong enough so that it can be picked up five to fifteen feet away. Unlike prior art systems which use an FM radio signal, using an audio or low frequency signal does not effect nearby radios or require an FCC operating license.

Figure 2:
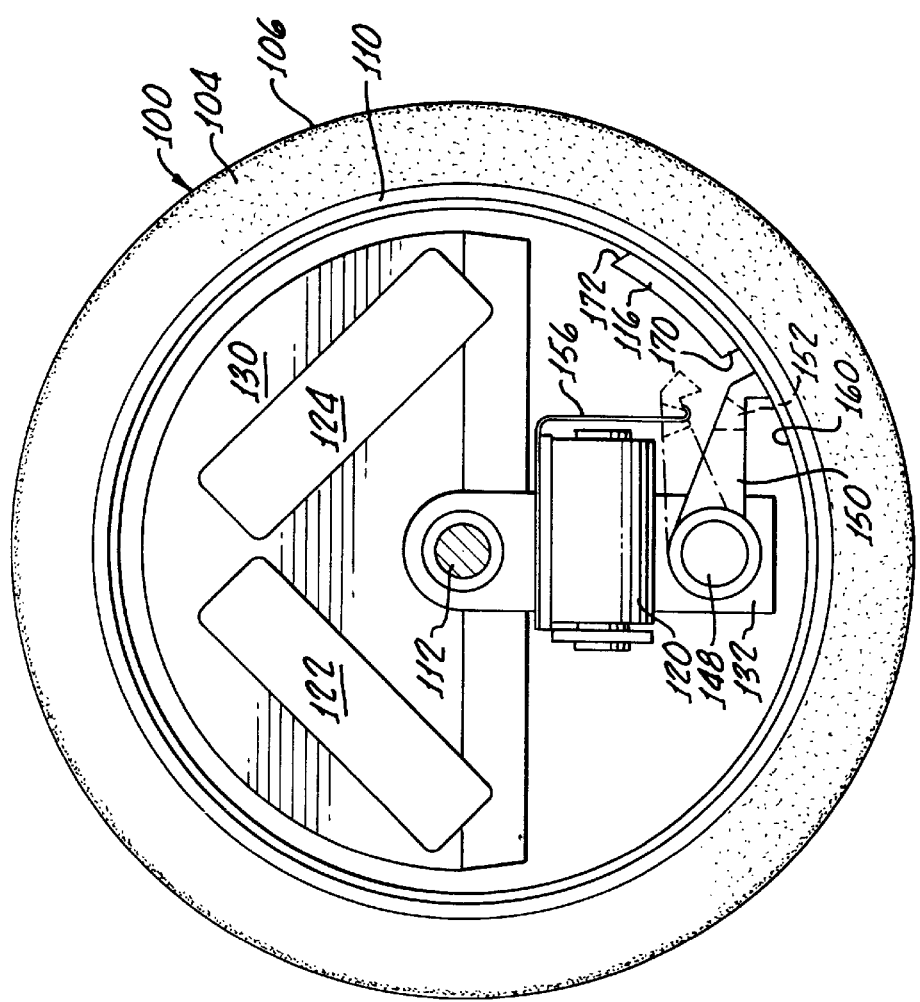
FIG. 2 is an enlarged side elevational view of one of the wheels of the present invention of one of the shopping carts of the system of FIG. 1, and showing its internal brake assembly.

A first preferred toggle brake and wheel assembly embodiment of the present invention is illustrated generally at 100 in FIGS. 2 and 3. Brake and wheel assembly 100 is an inside of the wheel construction, and this wheel 104 can be any of the wheels of the shopping cart 56 depicted in FIG. 1. Illustrated in FIGS. 2 and 3 is the urethane tire 106 mounted on the hub 110 of the wheel 104. The tire 106 and hub 110 rotate around the axle 112. A stopper or cleat 116 is mounted to the inside of the hub 110.

The rest of the assembly 100 is mounted inside of the hub 110 and so as to not rotate therewith. The solenoid coil 120 and two AA one-and-a-half volt batteries 122, 124 are operatively mounted to the circuit board 130. The circuit board 130 in turn is mounted to a stationary backplate 132. As a bolt is tightened, spacers 134, 136 squeeze on the backplate 132 sandwiched therebetween, fixing it in place. Also, a keyed bolt is used to mount the wheel to the caster assembly. This keyed bolt locks to the caster assembly thereby fixing it in place with bearings 140, 142 on the outside. The bearings 140, 142 are pressed in with an interference fit with the spacers 134, 136 in between.

The toggle pivot shaft 148 is fixed perpendicular and directly to the backplate 130. The toggle 150, which is pivotal about the shaft 148, has a notch 152 at its end. The distal end of a flat spring 156 passes through an opening in the toggle 150 and can latch into the notch 152 as shown by the dotted lines in FIG. 2, to hold the toggle up, away from the hub 110 and out of the way of the stopper or cleat 116. Thereby the assembly 100 is in an unlocking condition.

When the solenoid 120 is actuated it magnetically draws the flat spring 156 towards it. The flat spring 156 is pulled out of or separated from the notch 152. The toggle 150 then gravity drops down to and against the inside surface 160 of the hub 110. As the wheel 104 rotates, the end of the toggle 150 then engages and wedges against the stopper or cleat 116. In one direction an outer edge of the toggle 150 wedges against the stopper 116 at surface 170. In the other direction the notch 152 hooks onto the cleat or stopper 116 at surface 172, as can be understood from FIG. 2. Rotation of the wheel 104 in both directions is thereby blocked.

To unlock the wheel 104, a special reset key (not shown) is inserted into the assembly 100 through an opening and turned. The toggle 150 is thereby lifted via a reset lever, biasing the spring clip 156 back into locking engagement with the notch 152. More specifically, the reset key contains a transmitter (built into the handle). And, turning the key causes the transmitter to activate the wheel's electronic circuit thereby activating solenoid 120 and causing the flat spring 156 to be drawn to solenoid 120. This allows the hook portion of spring 156 to pass through the hole or notch 152, as the key is turned to raise toggle 150 to the unlocked position.

The circuit board 130 includes electronics (transistors, capacitors, etc.) receiving, amplifying and detecting the frequency signal from the antenna 66. When the frequency signal is detected, the solenoid 120 is activated briefly (e.g., for one and one half seconds), just long enough to draw the flat spring 156 and release the toggle 150. The specific electronic components used can be very sensitive, drawing very little power. Thus, the assembly 110 has very low power requirements. Under normal usage the batteries 122, 124 will last about four years, which is the manufacturer's suggested shelf life for them.

The circuit board 130 can also include a motion detector to conserve the batteries 122, 124. The detector can be a thin ceramic piezo film. Thus, when the cart 56 is at rest (not being used) a sensitive passive switch turns the detector off.

More particularly, another battery saving feature of the circuit board 130 can be limiting the activation line of the output switch. The transmitter frequency is received, amplified and fed into a comparator, rectified, filtered and turns on an output switch (a field effect transistor), activating the solenoid 120. A delay circuit clamps the solenoid actuator to one and one-half seconds. That is, power is only very briefly supplied to the solenoid 130, which prevents the batteries 122, 124 from being burnt up if the cart 56 is left in the signal field. The system is automatically reset by moving the cart 56 out of the signal field, the applied voltage drops to zero and the solenoid 120 is ready to be activated again. The toggle 150 is reset on the leaf spring 156 using the reset key.

The circuit board 130 can also include a tuned circuit to reject other frequencies. Thereby four or five alternative usable frequencies can be used. Thus, advantageously a cart 56 manufactured with one of those frequencies would not be usable in transmitting systems that use any of the other frequencies, thereby further discouraging theft of the carts. Notch filters can be used to define the different frequencies. A mercury ball type of motion detector can be used. Decoding or smart circuitry can be used, but they may tend to use unnecessary amounts of battery power.

The inside-of-the-wheel assembly 100 is a desirable arrangement since the braking components are not outside of the wheel 104 where they may be vulnerable to impact, damage, the weather (rain, snow, ice, etc.), spilled liquids, chewing gum interference or the like. Also, attention must be given that the external braking components do not stick out so far as to interfere with the empty nesting of the carts 56.

An alternative brake and wheel assembly of this invention mounts the brake outside of the wheel and thereby exerts a braking action on the outside of the wheel. This alternative assembly is shown generally at 180 in FIGS. 4 and 5. The brake components are protectively disposed in a housing which itself is positioned so as not to interfere with cart nesting. Representative dimensions 182a, 182b and 182c of 0.451, 2.069 and 1.250 inches, respectively, are denoted in FIG. 5. Although depicted as applying a braking force to an edge of the wheel 184, as is explained below, it is also within the scope of the invention for the brake assembly (180) to be adapted to apply the force elsewhere on the wheel, such as on the side of the wheel.

Figure 4:
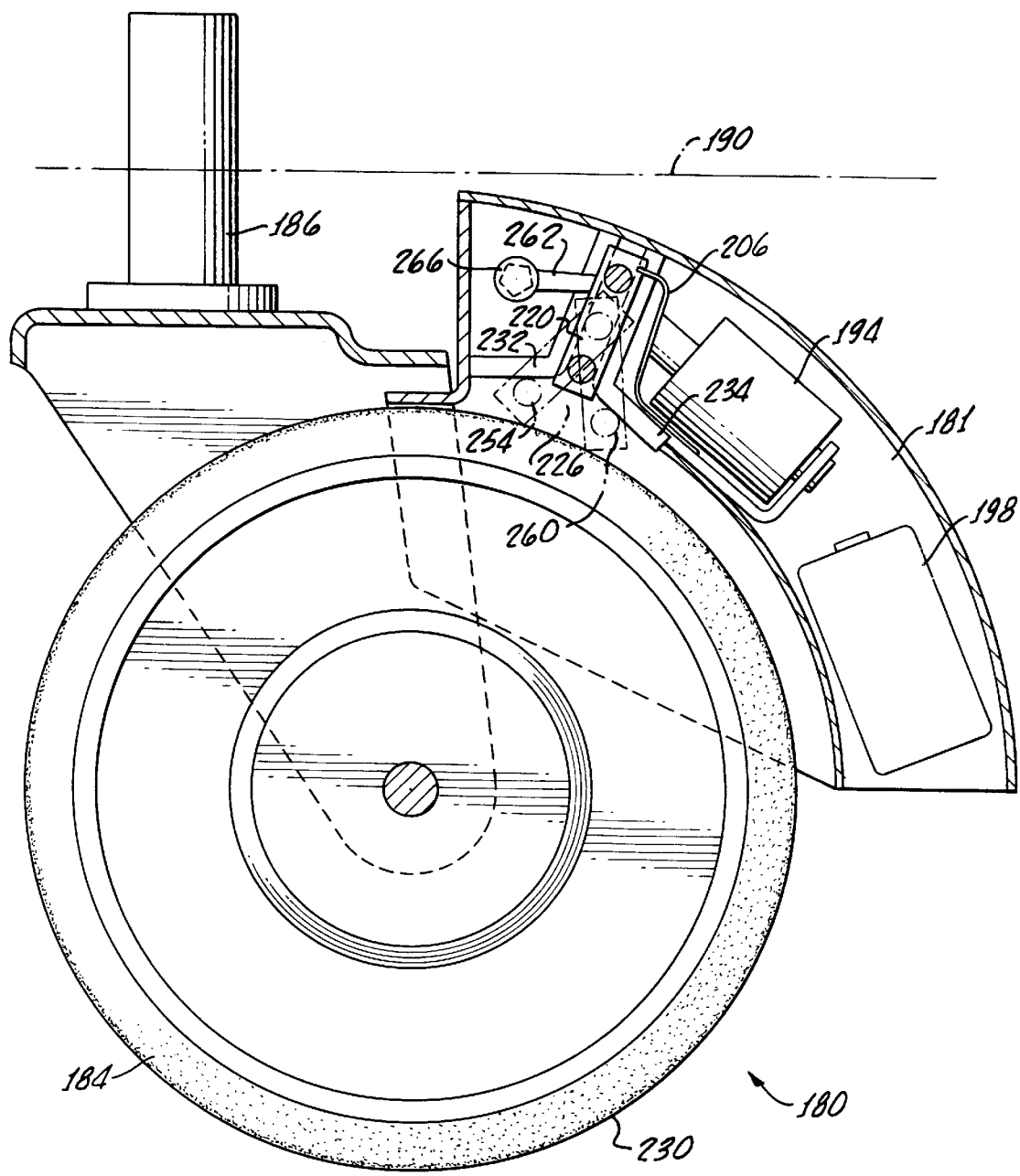
FIG. 4 is a side elevational view of an alternative shopping cart wheel and external brake assembly of the present invention.

Assembly 180 includes a standard five inch wheel 184 mounted to a standard caster assembly 186 of the shopping cart 56 of FIG. 1, for example. The brake assembly 180 is secured to the caster assembly 186 and wraps about a quarter the way around the perimeter of the wheel 184. It has a low profile so as to not interfere with nesting or stacking of the carts 56. Referring to FIG. 4, it is about an eighth of an inch below the stacking interference line 190. This assembly 180 can be designed as a retrofit kit which can be installed on existing parts of a cart (56) or as a complete brake-caster system (together with caster assembly 186) to be installed when the shopping carts (56) are first manufactured.

Figure 5:
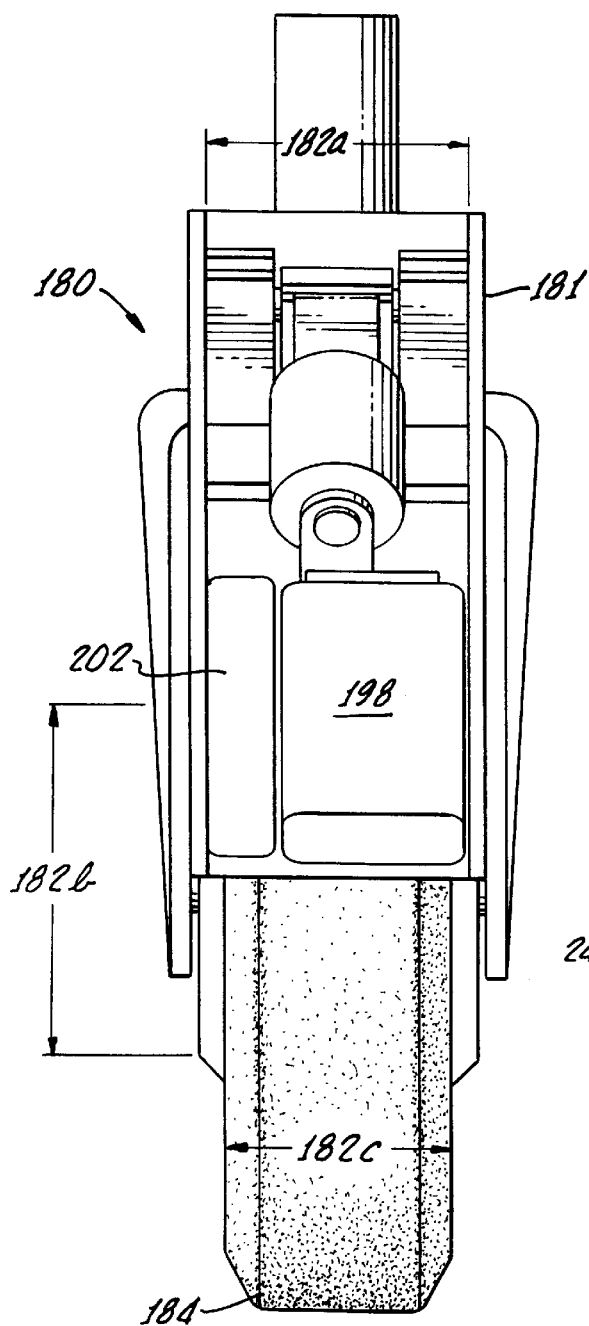
FIG. 5 is an end elevational view of the wheel and external brake assembly of FIG. 4 with the solenoid and back cover thereof omitted for the sake of clarity.

The outside-the-wheel brake assembly 180 includes a toggle brake arrangement similar in principle to that of assembly 100. A solenoid coil 194 is powered by one or more batteries 198 (such as a single standard nine volt battery or two 1.5 volt double A cells) and controlled by a circuit board 202 (FIG. 5). A number of circuit board constructions can be used with this invention as would be apparent to those skilled in the art from this disclosure taken in its entirety. Again, the circuit board 202 is preferably designed so that there is a very low drain on the batteries 198, in the range of micromillamps. Thereby the battery 198 will last essentially as long as its manufacturer's suggested shelf life.

Figure 6:
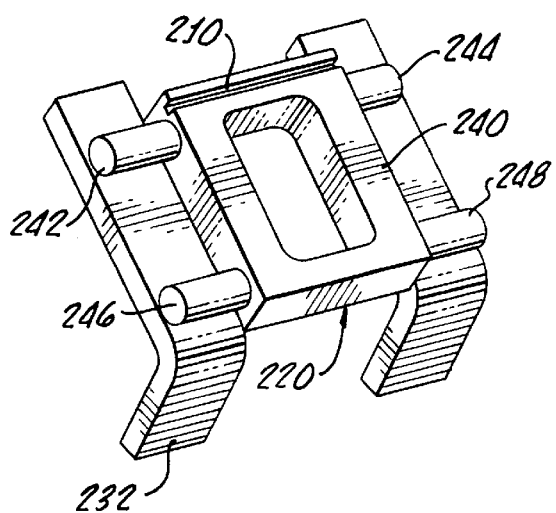
FIG. 6 is an enlarged perspective view showing in isolation the toggle assembly of the wheel of FIG. 4.

Associated with the solenoid coil 194 is a leaf spring or catch 206 which when in a first position is in a slot 210 on the toggle 220 holding the toggle up off of the wheel 184 in a non-braking condition. This slot 210 is best shown in FIG. 6. The coil spring 206 is activated by the electronics when the cart 56 or more specifically the receiver function of the circuit board 202 is within the operative range of the antenna 66. When activated it magnetically draws the spring 206 out of the slot 210 and towards it. The toggle 220 is then released to drop down a channel 226 to contact in a generally perpendicular orientation to the outer surface of the tire 230 of the wheel 184. The channel 226 is defined by two opposing pairs of outwardly and downwardly curving ramps 232, 234. One pair of those ramps 232 is clearly illustrated in FIG. 6. As seen therein the toggle 220 includes an open rectangular member 240 with outwardly-extending pins 242, 244, 246, 248. The rectangular member 240 is disposed between the pairs of ramps 232, 234, and the pins 242, 244, 246, 248 engage and slide along the ramps.

When the toggle 220 is dropped by the release of the leaf spring 206 therefrom, the rectangular member 240 impacts the wheel 180. Then when the wheel 180 is rotated in one direction the lower end of the toggle 220 moves about a third of an inch or so. The toggle 220 thereby abuts against the curved portion of one of the pairs of ramps 232 and wedges with a braking action against the tire. This position is shown by the dotted line representation at 254 in FIG. 4. If the wheel 180 rotates in the opposite direction, the toggle end moves in the opposite direction to abut the other pair of ramps 234. It wedges with a braking action directly against the tire 230, and this position is shown by the dotted line representation at 260 in FIG. 4.

A reset lever 262 has one end disposed in the rectangular member 240 and the opposite end secured to a pivot post 266, as shown in FIG. 4. After the toggle 220 has been released, as when the cart 56 has entered or past the antenna zone, it is desired to reset the lock assembly. To reset it, a special reset key is inserted into a side opening to engage the pivot post 266. The key is turned, lifting the lever 262 and thereby the rectangular member 240. The lifted toggle 220 biases the coil spring 206 back and into its locking position in the slot 210. The brake is thereby reset for another wheel locking or braking action when the cart 56 is again rolled to the zone of the antenna 66.

A third wheel-brake assembly of the present invention is shown generally at 280 in FIGS. 7 and 8. Instead of a pivoting toggle such as in FIG. 2, it uses a drop toggle or drop pin 284 guided when dropped in a guide block 286. Similar to the previously-described embodiments also provided are batteries 290, 292, a circuit board 294, a stationary backplate 296, a coil assembly 298, a coil mount 300 and a cleat or stopper 302.

The brake assemblies disclosed herein are simple of construction and operation, having essentially only three moving parts—the toggle, the reset lever and the spring. No gears or motors are needed. The parts are protected from outside damage and the elements. Their simple construction makes them very inexpensive to manufacture; it is expected that they can be manufactured for less than $25.00 each. They have a dependable unlock mode, because the spring exerts a positive spring pressure which is not released even when the brake or cart is subjected to a strong impact.

From the foregoing detailed description, it will be evident that there are a number of changes, adaptations and modifications of the present invention which come within the province of those skilled in the art. For example, the brake assembly can be used on wheels of other vehicles or activated by means other than the antenna or even without using a circuit board. However, it is intended that all such variations not departing from the spirit of the invention be considered as within the scope thereof as limited solely by the claims appended hereto.

What is claimed is:

1. A wheel-and-brake assembly for a vehicle, comprising:
 a wheel including a hub and a tire mounted on said hub;
 a cleat stopper mounted on said hub;
 a toggle mounted in said wheel and non-rotatable relative to a rotation axis of said wheel;
 a solenoid coil positioned in said wheel; and
 a clip which holds said toggle in a non-braking condition relative to said stopper and which releases said toggle from the non-braking condition when said coil is activated, said toggle when released moving to a braking condition engageable with an end of said stopper to brake rotation of said wheel in one direction and engageable with an opposite end of said stopper to brake rotation of said wheel in an opposite direction.

2. The assembly of claim 1 wherein said clip is spring biased to hold said toggle in the non-braking condition, and said coil when actuated magnetically pulls, against the spring bias, said clip away from said toggle to thereby release said toggle.

3. The assembly of claim 1 wherein said toggle when released from the non-braking condition pivots down to the braking condition.

4. The assembly of claim 1 wherein said toggle includes a notch, and said clip when holding said toggle in the non-braking condition engages in said notch.

5. The assembly of claim 1 further comprising reset means operable from outside of said wheel for resetting said toggle relative to said clip from the braking to the non-braking condition.

6. The assembly of claim 5 wherein said reset means includes an insert key.

7. The assembly of claim 1 wherein said wheel is mounted with a caster to the vehicle.

8. The assembly of claim 1 further comprising at least one battery mounted in said wheel for powering said solenoid coil.

9. The assembly of claim 1 wherein said toggle comprises an axial drop pin.

10. The assembly of claim 9 further comprising a guide block guiding axial movement of said drop pin between the braking and non-braking conditions.

11. The assembly of claim 1 wherein said toggle comprises a pivotal drop member.

12. The assembly of claim 1 wherein said toggle engages said stopper end with a wedging brake action and said opposite end with a hooking brake action.

13. A toggle brake assembly for a wheel of a vehicle, said assembly comprising:

a solenoid coil;

a toggle; and a catch positionable in a first position wherein said toggle is held in a nonbraking condition relative to the wheel and a second position, upon actuation of said coil, wherein said toggle is released to drop down to a braking condition against a rotatable surface of the wheel;

wherein said coil, said toggle and said catch are supportable by and movable with the vehicle;

wherein the rotatable surface of the wheel, which said toggle engages when in the braking condition, is an interior surface of the wheel; and wherein said coil, said toggle and said catch are mounted inside of the wheel.

14. A toggle brake assembly for a wheel of a vehicle, said assembly comprising:

a solenoid coil;

a toggle;

a catch positionable in a first position wherein said toggle is held in a nonbraking condition relative to the wheel and a second position, upon actuation of said coil, wherein said toggle is released to drop down to a braking condition against a rotatable surface of the wheel;

wherein said coil, said toggle and said catch are supportable by and movable with the vehicle;

wherein the rotatable surface of the wheel, which said toggle engages when in the braking condition, is an outside surface of the wheel; and a support housing outside of the wheel for said coil, said toggle and said catch;

wherein said support housing is mounted to a caster assembly of the vehicle.

15. A toggle brake assembly for a wheel of a vehicle, said assembly comprising:

a solenoid coil;

a toggle; and a catch positionable in a first position wherein said toggle is held in a nonbraking condition relative to the wheel and a second position, upon actuation of said coil, wherein said toggle is released to drop down to a braking condition against a rotatable surface of the wheel;

wherein said coil, said toggle and said catch are supportable by and movable with the vehicle; and wherein said toggle pivots about a toggle pivot point when moving from the first to the second position.

16. A toggle brake assembly for a wheel of a vehicle, said assembly comprising:

a solenoid coil;

a toggle; and a catch positionable in a first position wherein said toggle is held in a nonbraking condition relative to the wheel and a second position, upon actuation of said coil, wherein said toggle is released to drop down to a braking condition against a rotatable surface of the wheel;

wherein said coil, said toggle and said catch are supportable by and movable with the vehicle; and wherein when said toggle drops down to the braking condition, it pivots about an end thereof.

* * * * *